United States Patent
Corbett, Jr. et al.

(10) Patent No.: US 10,107,425 B2
(45) Date of Patent: Oct. 23, 2018

(54) JOINT RESTRAINT FOR MOLECULARLY ORIENTED PIPE AND METHOD OF MANUFACTURE USING A GROOVE FORMED ON A SPIGOT

(71) Applicant: S & B Technical Products, Inc., Fort Worth, TX (US)

(72) Inventors: Bradford G. Corbett, Jr., Fort Worth, TX (US); Guido Quesada, San Jose (CR)

(73) Assignee: S & B Technical Products, Inc., Fort Worth, TX (US)

( * ) Notice: Subject to any disclaimer, the term of this patent is extended or adjusted under 35 U.S.C. 154(b) by 296 days.

(21) Appl. No.: 15/018,397

(22) Filed: Feb. 8, 2016

(65) Prior Publication Data

US 2016/0245435 A1   Aug. 25, 2016

Related U.S. Application Data

(60) Provisional application No. 62/118,185, filed on Feb. 19, 2015.

(51) Int. Cl.
*B29C 57/08* (2006.01)
*F16L 21/02* (2006.01)
(Continued)

(52) U.S. Cl.
CPC ............ *F16L 21/02* (2013.01); *B29B 13/025* (2013.01); *B29C 57/00* (2013.01); *B29C 57/08* (2013.01);
(Continued)

(58) Field of Classification Search
CPC ......... F16L 21/02; F16L 47/08; F16L 37/088; F16L 47/12; F16L 37/08; B29C 57/08;
(Continued)

(56) References Cited

U.S. PATENT DOCUMENTS 3,539,205 A * 11/1970 Johnson, Jr. .......... B29C 57/045
                                                    285/260
3,712,631 A *  1/1973 Forchini ............... F16L 21/035
                                                    277/605

(Continued)

FOREIGN PATENT DOCUMENTS

EP            1471298 A1    10/2004
WO  PCT/US2016/017123      2/2016

*Primary Examiner* — Jacob Cigna

(74) *Attorney, Agent, or Firm* — Whitaker Chalk Swindle & Schwartz PLLC; Charles Gunter

(57) ABSTRACT

A pipe joining system and pipe joint are shown in which two sections of plastic pipe, particularly molecularly oriented pipe, are joined. A first section of plastic pipe has a female, belled pipe end with a mouth opening and having an exterior surface, an interior surface and having an interior circumferential recess formed in the belled pipe end adjacent the mouth opening on the interior surface thereof. A second section of plastic pipe having a mating male plastic pipe end has an interior surface and exterior surface. The exterior surface has a circumferential groove formed at one circumferential location thereof which is alignable with the interior recess formed within the mouth opening of the belled pipe end as the pipe joint is made-up. The circumferential groove is formed during the manufacture of the plastic pipe by expanding the pipe against a restraining element located in the interior of an expansion mold. The respective grooves contain elements of a restraint system which form a restrained joint when the male and female pipe sections are assembled.

5 Claims, 9 Drawing Sheets

(51) Int. Cl.
*B29C 65/70* (2006.01)
*B29C 65/00* (2006.01)
*F16L 37/08* (2006.01)
*F16L 37/088* (2006.01)
*F16L 47/08* (2006.01)
*F16L 47/12* (2006.01)
*B29B 13/02* (2006.01)
*B29C 57/00* (2006.01)
*B29K 27/06* (2006.01)
*B29L 23/00* (2006.01)

(52) U.S. Cl.
CPC .......... *B29C 65/70* (2013.01); *B29C 66/5221* (2013.01); *F16L 37/08* (2013.01); *F16L 37/088* (2013.01); *F16L 47/08* (2013.01); *F16L 47/12* (2013.01); *B29K 2027/06* (2013.01); *B29L 2023/22* (2013.01)

(58) Field of Classification Search
CPC ..... B29C 57/00; B29C 65/70; B29C 66/5221; B29B 13/025; B29K 2027/06; B29L 2023/22
See application file for complete search history.

(56) References Cited

U.S. PATENT DOCUMENTS

| | | | |
|---|---|---|---|
| 4,047,739 A | | 9/1977 | Aitken |
| 4,340,344 A | * | 7/1982 | Aston ................. B29C 49/46 264/535 |
| 4,428,900 A | * | 1/1984 | Riley ................. B29C 49/0073 264/526 |
| 4,850,621 A | * | 7/1989 | Umehara ............ F16L 13/142 285/322 |
| 5,816,625 A | | 10/1998 | Clarke |
| 6,340,181 B1 | | 1/2002 | Amatsutsu |
| 6,447,710 B1 | * | 9/2002 | Prevotat ................ B29C 49/08 264/532 |
| 7,523,964 B2 | * | 4/2009 | Sandman ............. F16L 17/025 277/616 |
| 2006/0119100 A1 | | 6/2006 | Jones et al. |
| 2008/0001399 A1 | * | 1/2008 | Ito ........................ F16L 21/035 285/238 |
| 2010/0194002 A1 | * | 8/2010 | Munoz de Juan ...... B29C 49/28 264/528 |
| 2013/0264820 A1 | * | 10/2013 | Munoz De Juan ... B29B 13/025 285/374 |

* cited by examiner

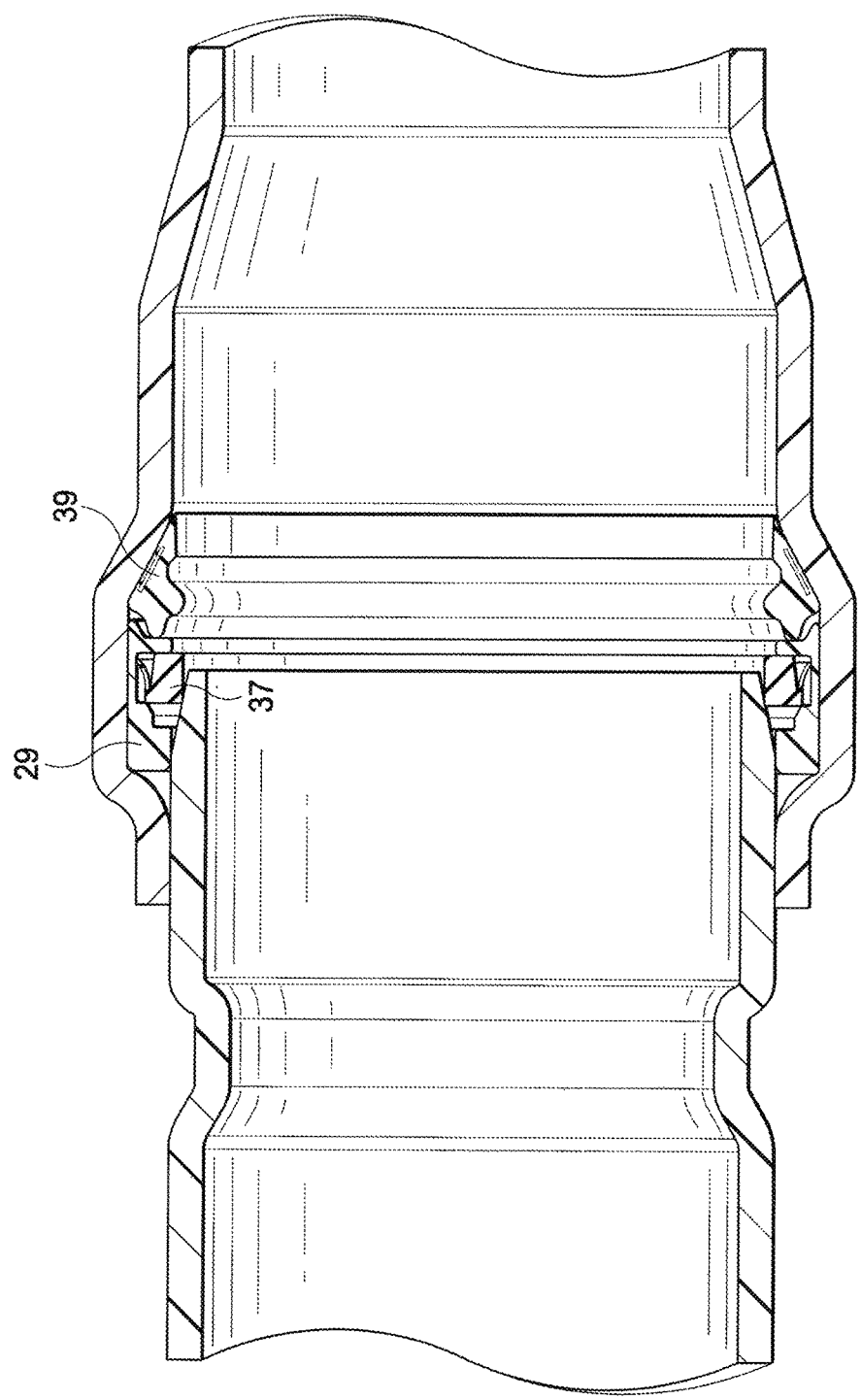

JOINT RESTRAINT FOR MOLECULARLY ORIENTED PIPE AND METHOD OF MANUFACTURE USING A GROOVE FORMED ON A SPIGOT

CROSS REFERENCE TO RELATED APPLICATION

The present application claims priority to U. S. Provisional Patent Application Ser. No. 62/118,185 filed Feb. 19, 2015, and entitled JOINT RESTRAINT FOR MOLECULARLY ORIENTED PIPE AND METHOD OF MANUFACTURE USING A GROOVE FORMED ON A SPIGOT.

BACKGROUND OF THE INVENTION

Field of the Invention

The present invention relates generally to joining and sealing systems for plastic pipe joints and, particularly, for pipe joints formed of molecularly oriented plastic pipe which incorporate a restraint feature to assist in maintaining the integrity of the joint.

Description of the Prior Art

Pipes formed from thermoplastic materials including polyolefins such as polyethylene, polypropylene and PVC are used in a variety of industries. For example, such pipes are commonly used in municipal water and sewer applications. In forming a joint between sections of pipe, the spigot or male pipe end is inserted within the female or socket pipe end. The actual manufacture of the mating sections of plastic pipe typically involves the reforming of the end of the pipe by reheating and shaping to some desired profile to provide a means of mating with the opposing end of the next pipe. The art of forming sockets (also called bells) on plastics pipes is well established, and there are numerous processes and methods in the literature. An annular, elastomeric ring or gasket is typically seated within a groove or "raceway" formed in the socket end of the thermoplastic pipe to assist in forming a sealed pipe joint between adjoining sections of pipe. As the spigot is inserted within the socket, the gasket provides the major seal capacity for the joint.

In recent years, pipe systems employing molecularly oriented pipe and particularly the so called "PVC-O" pipe have become increasingly popular. The designation "PVC-O" stands for polyvinylchloride oriented, sometimes referred to simply as molecularly oriented pipe, or "MOP." It is well established in the literature that molecular orientation of plastics can provide enhanced mechanical properties for plastic pipe of the type under consideration, and such materials are commonly used for plastics pipes. The molecularly oriented thermoplastic materials enhance the strength of the article in certain directions by orienting the molecules in the plastic material in such directions.

Orientation is achieved by drawing or stretching the material under appropriate conditions of temperature, such that a strain (i.e. deviation from the originally formed dimensions) is induced in the plastics material to cause alignment of the molecules, and thereafter cooling the material while drawn to lock in that strain. A number of methods have been proposed whereby this principle is applied to plastic pipes, in particular in order to enhance their strength under internal pressure by circumferential and/or axial forces, or by external forces acting on the pipeline.

For example, U.S. Pat. No. 4,428,900, shows a pipe of oriented thermoplastic polymeric material having an integral socket which is manufactured by expanding a tubular blank. The tubular blank is heated by circulation of hot water to a temperature at which deformation will induce orientation of the polymer molecules. The blank is then expanded radially outward against a mold by application of internal pressure.

U.S. Pat. No. 5,449,487, shows an apparatus and method for orienting plastic pipe. A heated pipe is oriented radially by means of a conically widening mandrel which is located downstream of the plastic extruder.

The above examples are intended merely to be illustrative of the general state of the art in the manufacture of molecularly oriented pipe.

Whether the pipeline system in question is the more ordinary PVC pipeline, or the more exotic PVC-O pipeline, it is often desirable to provide a "restrained joint" to insure that the spigot or male pipe end and the female or socket end do not separate due to internal or external forces, such as hydraulic forces that exist inside the pipeline, or external forces, such as bends in the direction of the pipeline, earthquakes or ground movement, and the like.

The problem is exacerbated in the case of PVC-O pipe joints in that the prevalent socket end is often provided with an "Anger Raceway" for receiving the sealing gasket. Since an advantage of PVC-O pipe is that it can be thinner with the same type strength as traditional PVC pipe, the Anger Raceway has a different geometry than the traditional socketed grooves provided in the more traditional "Rieber" gasket sealing systems for traditional PVC pipe. This geometry has proved to be a more difficult problem from the standpoint of providing a securely sealed joint than the traditional PVC pipe joint.

One approach to joining molecularly oriented pipe with a "restrained joint" was presented in U.S. Patent Publication No. 2011/0062700 to Corbett, Jr., assigned to the assignee of the present invention. That publication disclosed a method for joining molecularly oriented pipe in which a coupling is provided which is formed of a material other than molecularly oriented pipe, such as ordinary PVC pipe. The coupling is formed as a tubular body with a combination sealing and restraint mechanism located in each of two opposing end openings of the coupling that seal and restrain mating plain spigot ends of the molecularly oriented pipe. Because the coupling is made of a material such as ordinary PVC, the sealing and restraint mechanisms can be installed in internal grooves provided in the coupling interior during normal pipe belling operations without introducing unacceptable levels of stress or strain into the product. While providing a workable solution, that approach had the disadvantage of requiring more coupling components, adding to the cost of each joint in the pipeline system.

There are presently no other commercially available solutions to the above problem known to Applicant. The existing solutions have a limited pressure range and typically rely on cutting a notch notch or the indentation of the PVC-O pipe which is typically hard and relatively brittle. In the case case of restraint mechanisms which utilize a circumferential notch machined around the circumference of the spigot, the notch presents a weak point due to the brittle nature of the PVC-O PVC-O material.

A need continues to exist, therefore, for improved techniques for manufacturing and joining plastic pipe with restrained joints and, particularly molecularly oriented pipe such as PVC-O pipe, which techniques take into account the unique properties of these types of molecularly oriented plastic materials.

SUMMARY OF THE INVENTION

A joining system is shown for use in assembling a restrained joint of a first and second sections of plastic pipe, particularly where the pipe is molecularly oriented pipe, such as PVC-O pipe. A first section of plastic pipe has a female, belled pipe end with a mouth opening, an exterior surface, an interior surface, and having an interior circumferential recess formed in the belled pipe end adjacent the mouth opening on the interior surface thereof. The circumferential recess is formed during the manufacture of the plastic pipe, rather than being machined, as by cutting a notch in the plastic material of the pipe.

A second section of plastic pipe has a mating male plastic pipe end having an interior surface and exterior surface. The exterior surface has at least one circumferential groove formed at one circumferential location thereof which is alignable with the interior recess formed within the mouth opening of the belled pipe end when the male pipe end is inserted within the mouth opening of the belled pipe end to form a joint. The circumferential groove is formed during the manufacture of the plastic pipe, rather than being machined.

In one version of the joining system of the invention, a ring shaped belled pipe end casing is installed within the circumferential recess provided in the belled end of the first section of plastic pipe. The belled pipe end casing has an inner circumferential surface and an outer circumferential surface and has at least one circumferential raceway formed at one inner circumferential location on the inner circumferential surface thereof. A lock ring is located within the circumferential raceway of the belled pipe end casing.

An associated sealing element is co-located within the circumferential recess provided in the first section of plastic pipe adjacent the belied end casing element. The sealing element has an inner circumferential region and an outer circumferential region, the outer circumferential region being arranged to form a seal with the interior surface of the belled end while the inner circumferential region forms a sealing surface for the exterior surface of the mating male pipe section.

A spigot end casing element is located within the circumferential groove formed on the exterior surface of the male plastic pipe end, the spigot end casing element having an internal circumferential raceway. The lock ring located in the raceway of the belled pipe end casing engages the raceway formed in the spigot end casing element to form a restrained joint as the male plastic pipe end is inserted within the female pipe end.

In another version of the joining system of the invention, a first section of plastic pipe is provided having a female, belied pipe end with a mouth opening and having an exterior surface, an interior surface and having a first interior circumferential recess formed in the belled pipe end adjacent the mouth opening on the interior surface thereof. The first circumferential recess being formed during the manufacture of the plastic pipe.

A second section of plastic pipe has a mating male plastic pipe end having an interior surface and exterior surface and an end opening, and wherein the exterior surface has at least one circumferential groove formed at one circumferential location thereof which is alignable with the first interior recess formed in the belled pipe end when the male pipe end is inserted within the mouth opening of the belled pipe end to form a joint. The circumferential groove is formed during the manufacture of the plastic pipe. A locking element is located in the circumferential groove formed on the exterior surface of the mating male pipe end.

An associated sealing element is located within a second circumferential recess provided in the first section of plastic pipe at a location further within the mouth opening of the belled pipe end. The second sealing element has an inner circumferential region and an outer circumferential region, the outer circumferential region being arranged to form a seal with the interior surface of the belied end while the inner circumferential region forms a sealing surface for the exterior surface of the mating male pipe section.

The locking element located in the circumferential groove on the exterior surface thereof engages the the first circumferential recess provided in the mouth opening of the belled pipe end to form a restrained joint as the male plastic pipe end is inserted within the female pipe end.

In yet another version of the joining system of the invention, a first section of plastic pipe is provided having a female, belied pipe end with a mouth opening and having an exterior surface, an interior surface and having an interior circumferential recess formed in the belled pipe end adjacent the mouth opening on the interior surface thereof. The interior circumferential recess is formed during the manufacture of the plastic pipe.

A second section of plastic pipe has a mating male plastic pipe end having an interior surface and exterior surface and an end opening, and wherein the exterior surface has at least one circumferential groove formed at one circumferential location thereof which is alignable with the interior recess formed in the belied pipe end when the male pipe end is inserted within the mouth opening of the belled pipe end to form a joint. The circumferential groove is formed during the manufacture of the plastic pipe. A locking element is located in the circumferential groove formed on the exterior surface of the mating male pipe end, the locking element comprising a rotating lock ring.

An associated sealing element is located within the interior circumferential recess provided in the belled pipe end of the first section of plastic pipe. The second sealing element has an inner circumferential region and an outer circumferential region, the outer circumferential region being arranged to form a seal with the interior surface of the belled end while the inner circumferential region forms a sealing surface for the exterior surface of the mating male pipe section.

The rotating lock ring which is located in the circumferential groove on the exterior surface of the male pipe section is rotated from a first radially extending position to a second relatively lesser radially extending position by contact with the belled end of the female pipe section. Contact between the rotating lock ring and the interior surface of the belled pipe end acts to form a restrained joint as the male plastic pipe end is inserted within the female pipe end.

In all versions of the invention, the circumferential groove formed on the exterior surface of the male pipe member is formed by shaping the plastic material used to form the plastic pipe during manufacture of the pipe, rather than being a machined notch cut into the plastic material. Preferably, the spigot is formed during a batch PVC-O process to include a grooved casing on the spigot side, or to include some other type of restraining device. Providing a casing on the spigot preserves the spigot wall thickness and can be compatible with existing "Rieber" seal systems in the socket portion of the joint.

In a preferred method for forming a groove on the spigot of a section of molecularly oriented pipe, a restraining element is provided in a groove formed on an exterior surface of the section of pipe during the manufacturing process. An expansion mold is provided having an exterior, an interior and a mold end cap. An annular restraining element is first located at a desired position within the mold interior. A section of molecularly oriented pipe is then loaded into the expansion mold, the section of pipe having previously been extruded at a predetermined reduced diameter. The mold end cap is then closed. Heat is then applied to the pipe until the pipe begins to soften and the pipe is expanded against the mold interior and restraining element by applying internal pressure to the softened pipe. The pipe is then allowed to cool and the mold is opening by opening or removing the mold end cap. The expanded pipe is then pulled from the mold with the result being that the restraining element is trapped in a groove formed on the expanded pipe exterior surface. One preferred restraining element is a metal casing element.

Additional objects, features and advantages will be apparent in the written description which follows.

BRIEF DESCRIPTION OF THE DRAWINGS

FIGS. 13 and 14 are quarter sectional views of the pipe joint of FIG. 1 showing the make-up of a of a pipe joint from the beginning of the insertion of the pipe spigot in FIG. 13 to the fully make-up make-up position in FIG. 14.

DETAILED DESCRIPTION OF THE INVENTION

Figure 1:
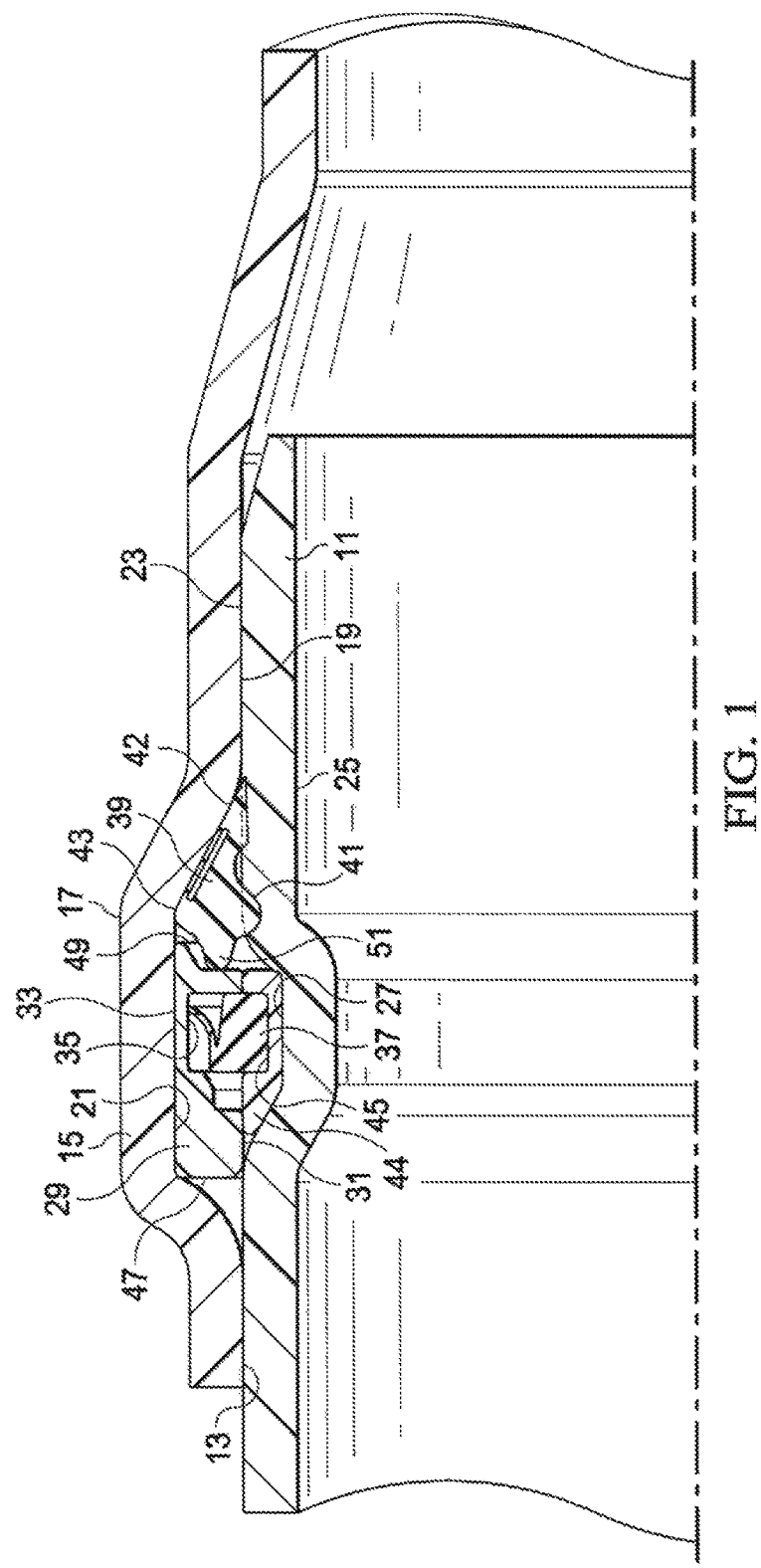
FIG. 1 is a quarter sectional view of a joint of molecularly oriented pipe, showing the pipe socket end with the mating spigot end being inserted into the socket end and showing one form of a joint restraint mechanism for the pipe joint.

As briefly discussed in the Background portion of the present application, plastic pressure pipe systems are used for the conveyance of drinking water, waste water, chemicals, heating and cooling fluids, foodstuffs, ultrapure liquids, slurries, gases, compressed air and vacuum system applications, both for above and below ground applications. Plastic pressure pipe systems have been in use in the United States for potable (drinking) water systems since at least about the 1950s. The types of plastic pipe in commercial use in the world today include, for example, unplasticized polyvinyl chloride (referred to as PVC or PVC-U), acrylonitrile butadiene styrene (ABS), post chlorinated polyvinyl chloride, (CPVC), polypropylene (PP), polyethylene (PE), polyvinylidene fluoride (PVDF) and polybutylene (PB) and more recently the molecularly oriented plastics.

A newer form of plastic material used in plastic pipe manufacture, which will be familiar to those skilled in the relevant arts, is the so called "PVC Molecularly Oriented Pipe", sometimes called "PVC-O pipe" or simply "MOP" for simplicity. As has been briefly explained, these molecularly oriented thermoplastic materials often exhibit enhanced strength of the article in certain directions by orienting the molecules in the plastic material in such direction, whereby the tensile strength of the plastic increases and the stretch decreases in such direction. This can provide advantages, for example when applied to tubular articles, where orienting is effected in the radial direction, for instance to increase the pressure resistance of the pipe, or in the longitudinal direction of the pipe, for instance to increase the tensile strength of the pipe, or in both directions (biaxial orientation). In the case of PVC-O pipe systems for municipal water and sewer pipe, the molecular orientation approximately doubles the material strength, so that only about half the wall thickness for the same pipe class is required to be used to meet the applicable specifications.

S&B Technical Products, Inc./Hultec, the assignee of the present invention, has previously developed specialized sealing gasket. designs for PVC-O pipe. These designs are generally referred to as the PRESSURE FIX™, in Europe, and as the MAMBO™ in North America. Although these gaskets have been shown to be effective sealing solutions for PVC-O in many instances, there continue to be instances where MOP and particularly PVC-O pipe is not able to adequately withstand the stresses encountered during pipe belling operations, or in maintaining sealing integrity at pipe joints in field applications.

As also discussed in the Background portion of the application, in the case of either the more ordinary PVC pipeline, or the more exotic PVC-O pipeline, it is often desirable to provide a "restrained joint" to insure that the spigot or male pipe end and the female or socket end do not separate due to internal or external forces, such as hydraulic forces that exist inside the pipeline, or external forces, such as bends in the direction of the pipeline, earthquakes or ground movement, and the like.

Problems have existed in the past in providing PVC-O pipe with effective and workable joint restraint systems, due in part to the unique characteristics of the molecularly oriented pipe material itself. The problem is exacerbated in the case of PVC-O pipe, joints in that the prevalent socket end is often provided with an "Anger Raceway" for receiving the sealing gasket. In other words, PVC-O pipe, unlike ordinary PVC-U pipe is typically provided with what is called a "30/60" internal circumferential groove or "Anger Groove" for forming, a non-restrained joint. The Anger Groove provides a very limited space for any type of joint restraint. The Anger pipe manufacturing method is described in U.S. Patent No. 4,379,115, issued Apr. 5, 1972, to Seach et al., and in various other references. Since an advantage of PVC-pipe is that it can be thinner with the same type strength as traditional PVC pipe, the Anger Raceway has a different geometry than the traditional socketed grooves provided in the more traditional "Rieber" gasket sealing systems for traditional PVC pipe. This geometry has proved to be more difficult problem from the standpoint of providing a securely sealed joint than the traditional PVC pipe joint.

The present invention is therefore directed to improvements in joints in plastic pipe, and particularly molecularly oriented pipe, such as PVC-O pipe by providing a more efficient and effective restraint system for such pipes. The restraint systems of the invention find particularly applicability to molecularly oriented pipe manufactured according to the Anger method, having the so called "30/60" internal circumferential groove.

Several examples will now be presented of restrained joints of the type under consideration which can be used in joining and sealing plastic pipe and which can be particularly advantageously used with the previously described molecularly oriented pipe.

Turning now to FIG. 1, there is shown, in quarter sectional fashion, a male or spigot pipe end 11 of one section of PVC-O pipe about to be inserted into the mouth or end opening 13 of a socket or bell pipe end 15 of a second, mating section of PVC-O pipe of the type under consideration. The first section of pipe is thus provided with a female, belled pipe end 15 with a mouth opening 13 and having an exterior surface 17, an interior surface 19 and having an interior circumferential recess 21 formed in the belled pipe end adjacent the mouth opening on the interior surface thereof. As will be more fully explained, the circumferential recess 21 is formed during the manufacture of the plastic pipe.

The spigot comprises a second section of plastic pipe having a mating male plastic pipe end 11 having an interior surface 25 and exterior surface 23. The exterior surface 23 has at least one circumferential groove 27 formed at one circumferential location thereof which is alignable with the interior recess 21 formed within the mouth opening 13 of the belied pipe end when the male pipe end is inserted within the mouth opening of the belled pipe end to form a joint As will be more fully described, the circumferential groove 27 is also formed during the manufacture of the plastic pipe.

In the particular version of the restraint system shown in FIG. 1 a ring shaped belled pipe end casing 29 is installed within the circumferential recess 21 provided in the belled end of the first section of plastic pipe. The belied pipe end casing, 29 has an inner circumferential surface 31 and an outer circumferential surface 33 and at least one circumferential raceway 35 formed at one inner circumferential location on the inner circumferential surface thereof, it should be understood that the particular restraint system being described is but one form of many possible restraint systems that might be used with the system of the invention. The common characteristic is that the systems all have some object located on the exterior of the spigot pipe end which is installed as an integral part of the spigot manufacturing process, rather than being installed in a machined notch, or the like.

Figure 12:
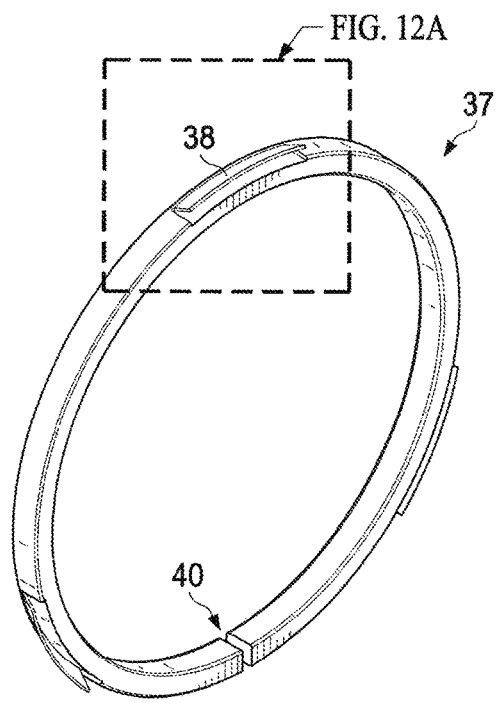
FIGS. 12 and 12A are isolated and close-up views of the lock ring which makes up a part of the joint restraint system of Figure, showing the wings or flaps located about the circumference of the lock ring.
Figure 12A:
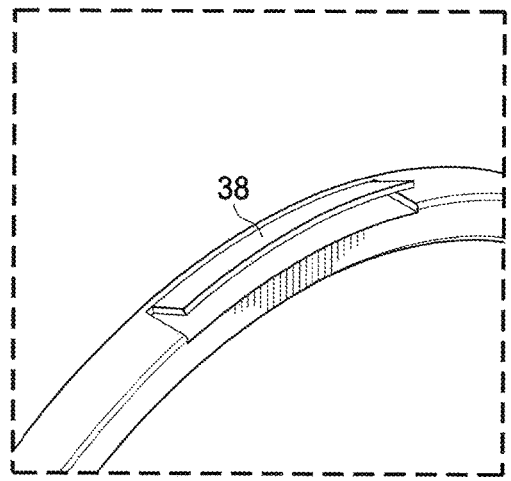

In the particular example of the version of the restraint system shown in FIG. 1, a lock ring 37 is located within the circumferential raceway 35 of the belled pipe end casing 29. One version of the lock ring 37 is shown in isolated fashion in FIGS. 12 and 12A. The ring is formed of metal or a hard plastic and has a plurality of "wings" or flaps 38 located about the circumference (in this case three equidistantly spaced flaps). There is one split or opening 40 in the circumference of the ring.

An associated sealing element 39 is also co-located within the circumferential recess 21 provided in the first section of plastic pipe adjacent the belled end casing element 29. In the example shown, the sealing element 39 has an inner circumferential region 41 and an outer circumferential region 43, the outer circumferential region being arranged to form a seal with the interior surface of the belled end while the inner circumferential region forms a sealing surface for the exterior surface of the mating male pipe section. The particular sealing elements shown has a downwardly extending sealing lip which is contacted by the exterior surface of the mating mate plastic pipe during the assembly of a pipe joint to form a compression seal. Also, in in the example shown, the particular sealing element can be seen, in cross section, to have a compression region (generally at 41) with a compression region axis which is generally parallel to a horizontal axis of a mouth opening of the plastic pipe. The sealing element also has a trailing lip region 42 which extends downwardly at an angle with respect to the compression region axis, the trailing lip region serving the dual function of both a belling ramp and secondary lip seal region for the mating male pipe.

Preferably, the belled pipe end casing 29 and the associated sealing element 39 which is co-located within the circumferential recess 21 provided in the first section of plastic pipe adjacent the belled end casing element are both installed on a belling mandrel and belied over in a pipe belling manufacturing operation. This is most preferably accomplished in a traditional "Rieber" style belling operation which will be familiar to those skilled in the relevant arts. This technology was developed by Rieber & Son of Bergen, Norway, in the 1970's and provided an integral sealing mechanism within the belied or female pipe end for sealing with the spigot end of a mating pipe formed from thermoplastic material. In the Rieber process, the elastomeric gasket was inserted within an internal groove in the socket end of the female pipe as the female or belled end was simultaneously being formed. The provision of a prestressed and anchored elastomeric gasket during the belling process at the pipe factory provided an improved socket end for a pipe joint with a sealing gasket which would not twist or flip or otherwise allow impurities to enter the sealing zones of the joint, thus increasing the reliability of the joint and decreasing the risk of leaks or possible failure due to abrasion. The Rieber process is described in the following issued United States patents, among others: U.S. Pat. Nos. 4,120,521; 4,061,459; 4,030,872; 3,965,715; 3,929,958; 3,887,992; 3,884,612; and 3,776,682. While the Rieber process provided an improved sealing system for plastic pipelines of the type under consideration, it did not include any integral restraint type mechanism.

Returning to FIG. 1, in the example shown, the belled end casing element 29 has a leading edge 47 and a trailing edge 49, the trailing edge 49 being provided with a mating profile which receives a leading nose portion 51 of the associated sealing element 39 The casing element 29 can conveniently be formed of a variety of materials, including metals, metal alloys, composite materials, plastics and hardened elastomer materials.

Figure 14:
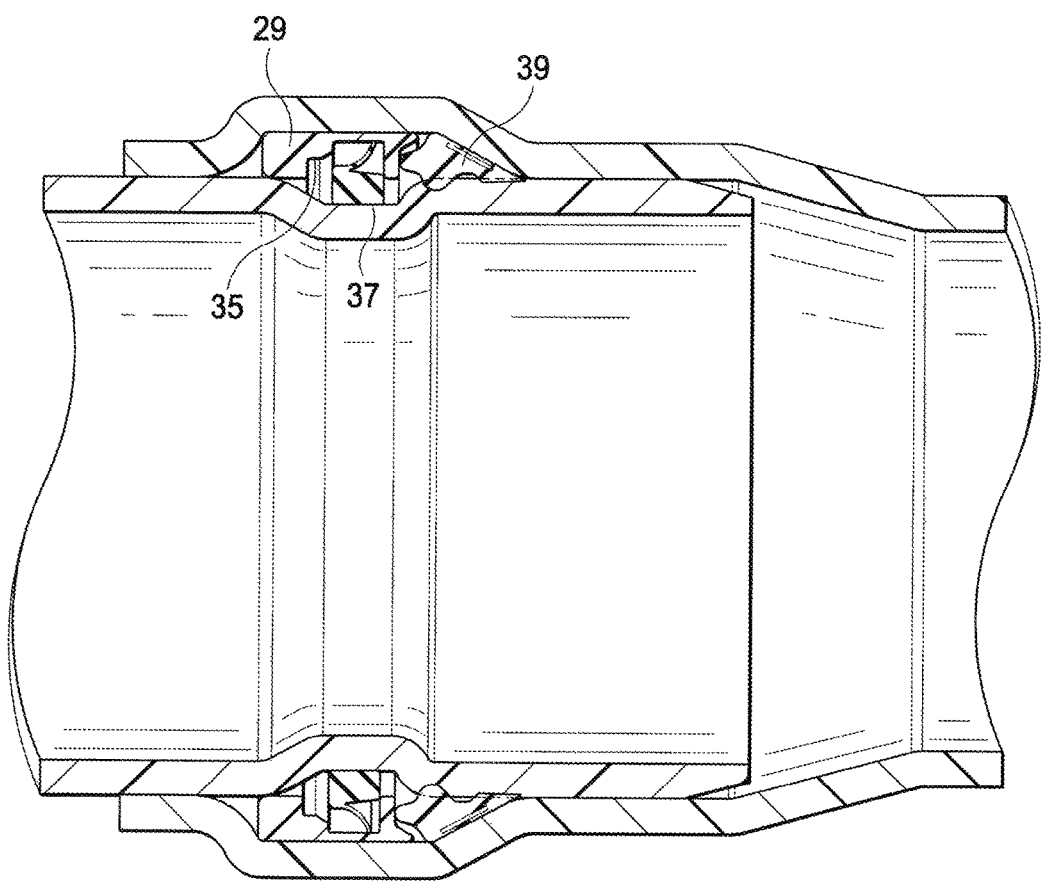

In the example shown, the spigot end casing element 44 has an internal circumferential raceway 45. As can be, seen from FIG. 1, the lock ring 37 located in the raceway 35 of the belled pipe end casing 29 engages the raceway 45 formed in the spigot end casing element 44 to form a restrained joint as the male plastic pipe end is inserted within the female pipe end, It will be appreciated that the lock ring 37 has an opening at one point in the circumference thereof (not shown) which allows it to radially expand and contract FIGS. 13 and 13A show the beginning of the joint assembly or make-up operation with the spigot beveled end beginning to enter the bell pipe end casing 29. FIGS. 14 and 14A show the continued assembly operation with the lock ring 37 engaged within the raceway 35, the wings (38 in FIGS. 12 and 12A) being compressed as the spigot pipe end enters the bell pipe end.

A particularly unique aspect of the present sealing and restraint system is the spigot end casing element 44 located within the circumferential groove 27 formed on the exterior surface 23 of the male plastic pipe end. As will be explained in greater detail he after, the circumferential groove 27 formed on the exterior surface 23 of the male pipe member is formed by shaping the plastic material used to form the plastic pipe during manufacture of the pipe, rather than being a machined notch cut into the plastic material.

Figure 2:
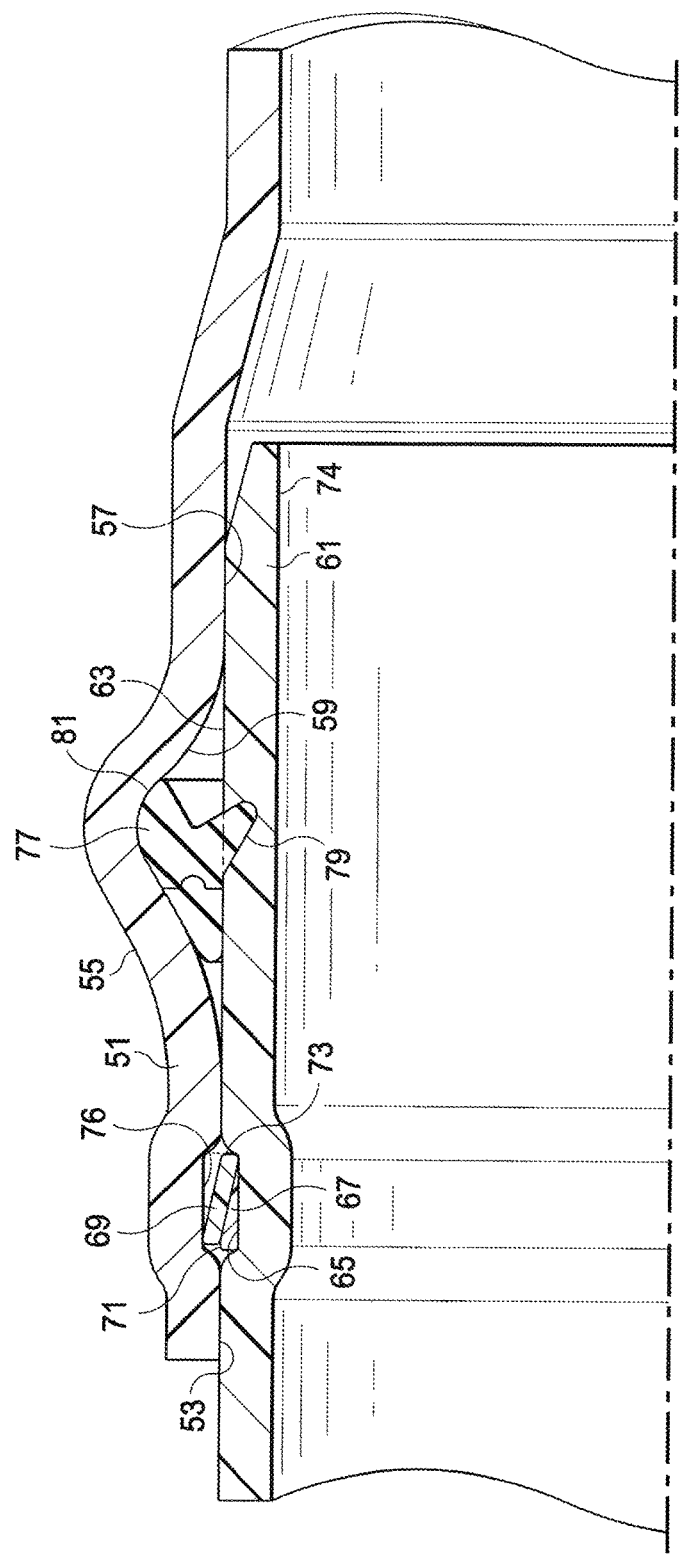
FIG. 2 is a view similar to FIG. 1, but showing another joint of molecularly oriented pipe having a different joint restraint assembly.

FIG. 2 shows another version of the sealing and restraint system of the invention which again features a first section of plastic pipe 51 having a female, belled pipe end with a mouth opening 53 and having an exterior surface 55, an interior surface 57 and having a first interior circumferential recess 59 formed in the belled pipe end adjacent the mouth opening on the interior surface thereof. Again, the first circumferential recess is formed during the manufacture of the plastic pipe.

A second section of plastic pipe 61 has a mating male plastic pipe end having an interior surface 63 and exterior surface and an end opening, and wherein the exterior surface has at least one circumferential groove 65 formed at one circumferential location thereof which is alignable with the first interior recess 59 formed in the belled pipe end when the male pipe end is inserted within the mouth opening of the belled pipe end to form a joint. The circumferential groove 65 is formed during the manufacture of the plastic pipe.

A locking element 67 is located in the circumferential groove 65 formed on the exterior surface of the mating male pipe end. In the example shown, the locking element 67 is a circumferential band which forms a reclining V-shape in cross section with two angled side regions 69, 71 which meet at a juncture 73. The juncture 73 of the angled side regions points in the direction of the male pipe end opening 74 as the male plastic pipe end is inserted within the female pipe end.

An associated sealing element 77 is located within a second circumferential recess 59 provided in the first section of plastic pipe at a location further within the mouth opening of the belied pipe end. The sealing element 77 has an inner circumferential region 79 and an outer circumferential region 81, the outer circumferential region being arranged to form a seal with the interior surface of the belled end while the inner circumferential region forms a sealing surface for the exterior surface of the mating male pipe section. As will be appreciated from FIG. 2, the locking element 67 located in the circumferential groove 65 on the exterior surface of the spigot engages the first circumferential recess 76 provided in the mouth opening 53 of the belled pipe end to form a restrained joint as the male plastic pipe end is inserted within the female pipe end.

Figure 3:
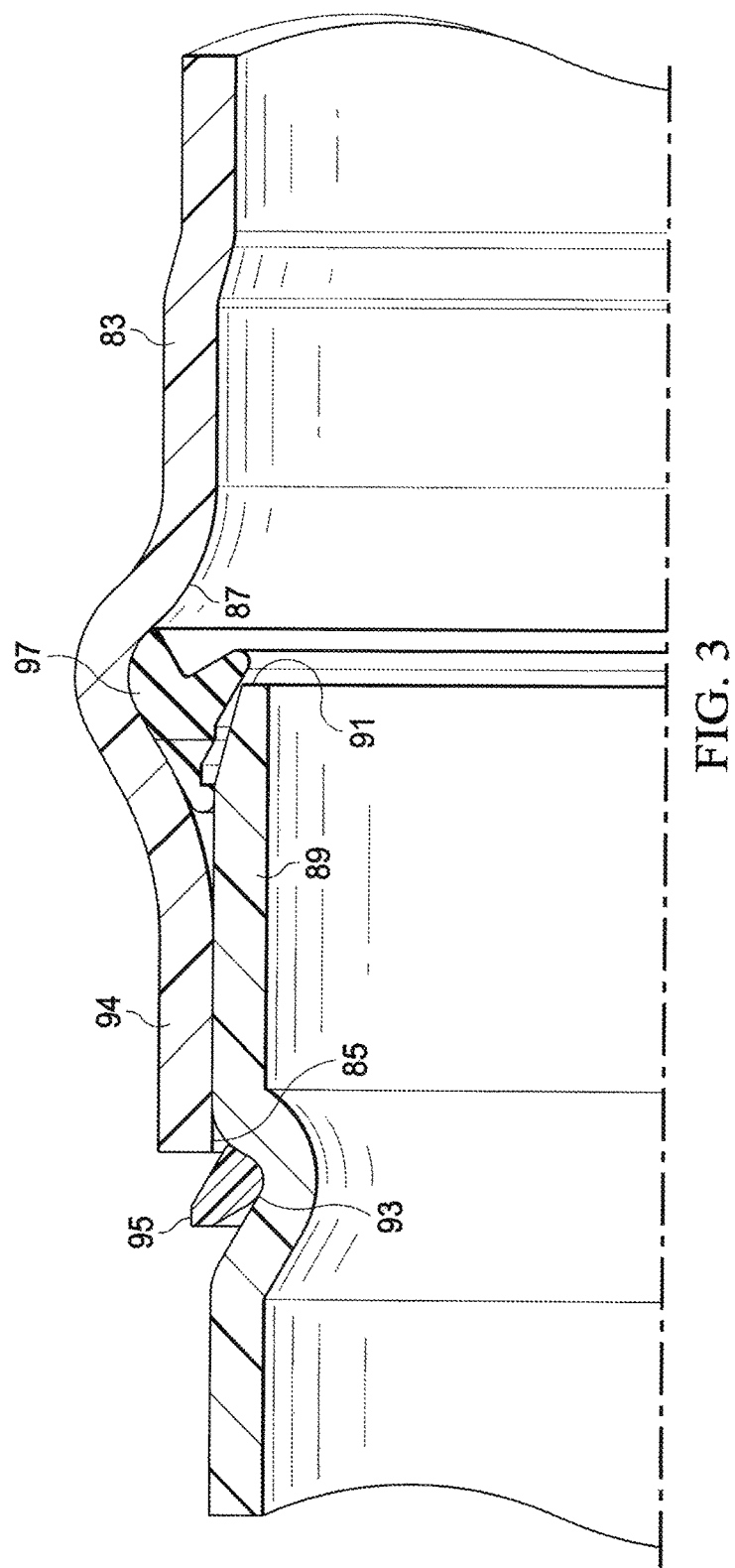
FIG. 3 is a view of another joint of molecularly oriented pipe, similar to FIG. 2, but showing yet a different joint restraint assembly.

FIG. 3 shows another version of the sealing and restraint system of the invention in which a first section of plastic pipe having a female, belled pipe end 83 with a mouth opening 85 and having an exterior surface, an interior surface and having an interior circumferential recess 87 formed in the belled pipe end adjacent the mouth opening on the interior surface thereof. The interior circumferential recess 8 is formed during the manufacture of the plastic pipe.

A second section of plastic pipe 89 has a mating male plastic pipe end having an interior surface and exterior surface and an end opening 91. The exterior surface has at least one circumferential groove 93 formed at one circumferential location thereof which is alignable with the interior recess 87 formed in the belled pipe end 83 when the male pipe end is inserted within the mouth opening of the belled pipe end to form a joint. The circumferential groove is formed during the manufacture of the plastic pipe. A locking element 95 is located in the circumferential groove 93 formed on the exterior surface of the mating male pipe end. In this case, the locking element 95 comprises a rotating lock ring.

As in the previously described versions of the invention, an associated sealing element 97 is located within the interior circumferential recess 87 provided in the belled pipe end of the first section of plastic pipe. The sealing element 97 has an inner circumferential region and an outer circumferential region, the outer circumferential region being arranged to form a seal with the interior surface of the belled end while the inner circumferential region forms a sealing surface for the exterior surface of the mating male pipe section. The rotating lock ring 95 which is located in the circumferential groove 93 on the exterior surface of the male pipe section is rotated from a first radially extending position to a second relatively lesser radially extending position by contact with the belled end 94 of the female pipe section, contact between the rotating lock ring and the interior surface of the belled pipe end acting to form a restrained joint as the male plastic pipe end is inserted within the female pipe end.

Prior to discussing the preferred manufacturing method for forming the sealing and restraint system of the invention, the two commonly used existing methods for manufacturing PVC-O pipe will be briefly discussed. Both processes start by extruding a length of PVC-U pipe at a reduced diameter and increased wall thickness, followed by heating the pipe to the glassy transition temperature and expanding it to the desired diameter and wall thickness.

The following is an example of a "batch process" for producing PVC-O pipe:

Extrude a pipe at 50% OD and 200% thickness of desired product. Cut into 7.1 m sections.

Insert length of starting stock into a closed mold. This mold is a jacketed cylinder approximately 7.6 meters (25 ft) long including bell-forming segment that is bolted on its end. Each end of the starting stock is "pinched down" and held in place.

Heat the pipe near its glassy transition temperature. Use internal pressure to expand the pipe until it comes in contact with the mold.

Cool the mold. After the pipe hardens again it will undergo thermal contraction so it detaches from the mold surface.

Remove expanded pie from the mold.

The pipe is transported to a cutting station where each of the "pinched down" ends is cut off to form the final 6.1 meter (20 ft) laying length.

The following is an example of a "continuous process" for producing PVC-O pipe:

Extrude a pipe, or starting stock, 50% of the desired OD and having twice the wall thickness of the desired finished product.

The starting stock goes through a "conditioning tank" where it is uniformly heated to a desired temperature.

The starting stock is pulled through an "expansion zone" by a second haul-off where further heat brings the stock above the Tg of PVC. Desired dimensions are attained in the expansion zone.

The oriented pipe is cooled in a spray tank.

The oriented pipe is cut to length using a special rotary saw.

The oriented pipe is transported to a belling machine and the bell socket is formed.

Belling and gasket options for commercially available PVC-O pipe may vary, but a common approach is to form a bell or socket end with an internal circumferential groove for receiving an annular sealing gasket.

FIGS. 4-11 illustrate, in simplified fashion, one method for forming the sealing and restraint systems of the invention. A pipe section is formed with a spigot pipe end with an external casing, the casing being installed in a groove formed on the exterior of the spigot as an integral step in the pipe manufacturing process.

Figure 4:
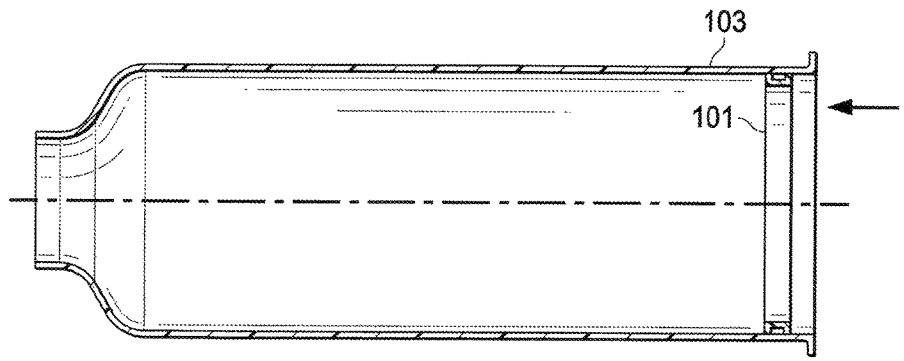
FIGS. 4-11 are simplified, partly schematic views of a process for producing a spigot pipe end with an external casing, the casing being installed in a groove formed on the exterior of the spigot as an integral step in the pipe manufacturing process.
Figure 5:
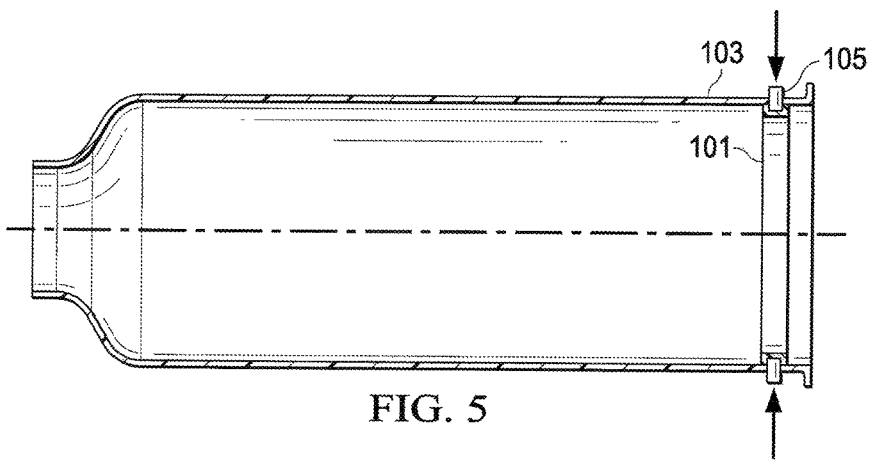
Figure 6:
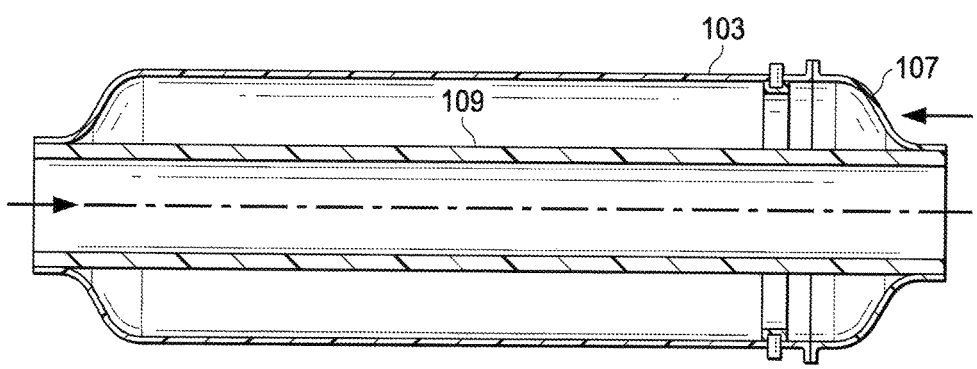

FIG. 4 shows a spigot casing 101 being loaded in an open PVC-O expansion mold 103. FIG. 5 shows the casing 101 being fixed in position, as by the use of retaining pins 105. In FIG. 6, the mold 103 has been closed with an end cap 107 and a pipe 109 is loaded into the mold. The pipe 109 has previously been extruded at a predetermined reduced diameter.

Figure 7:
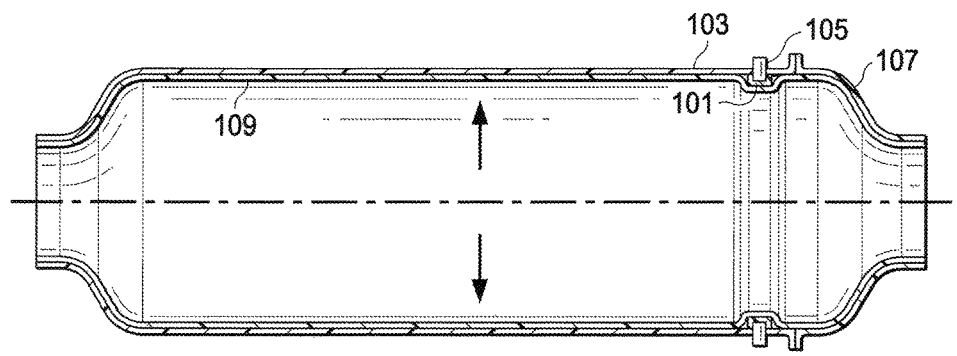
Figure 8:
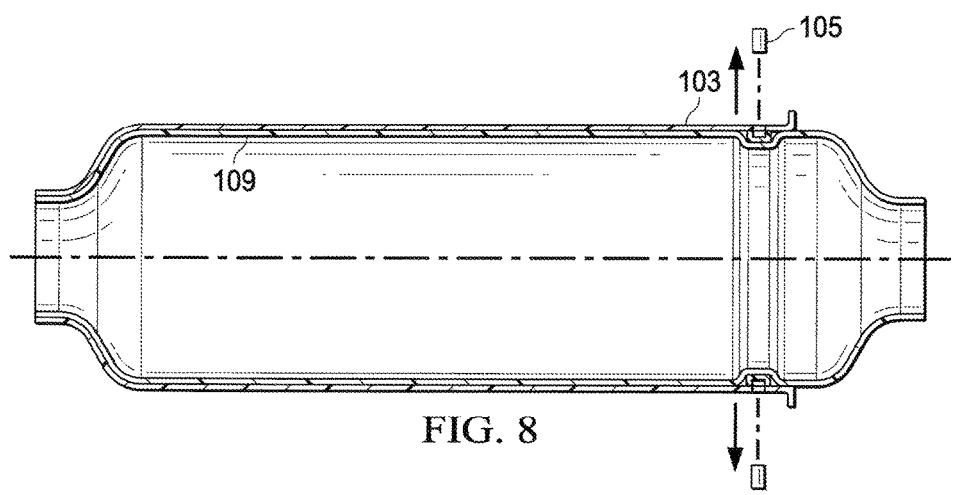
Figure 9:
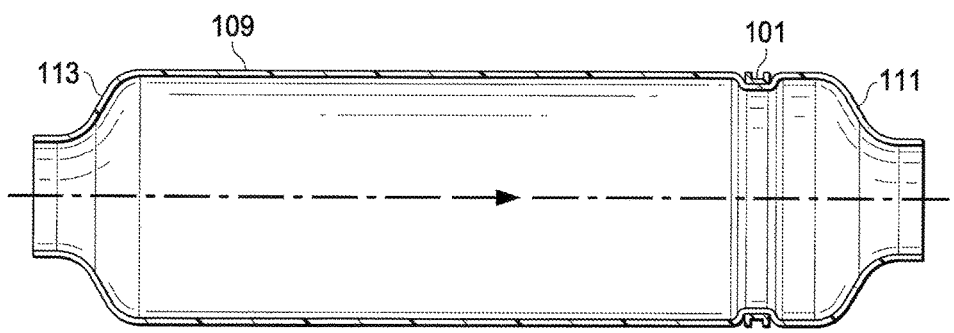

In the next step in the method of the invention, shown in FIG. 7, the pipe 109 is heated until soft and then expanded against the mold 103 and casing 101 with internal pressure being applied to the pipe. In the next step, the mold and pipe are cooled, the pins 105 are removed and the mold is opening by removing the mold end cap. In the following step, shown in FIG. 9, the expanded pipe is pulled from the mold with the casing 101 being trapped in a groove formed on the exterior surface of the expanded pipe.

Figure 10:
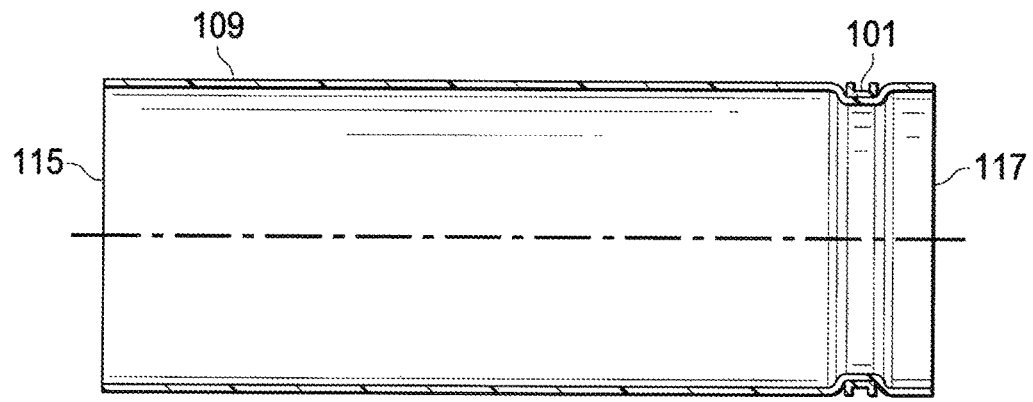
Figure 11:
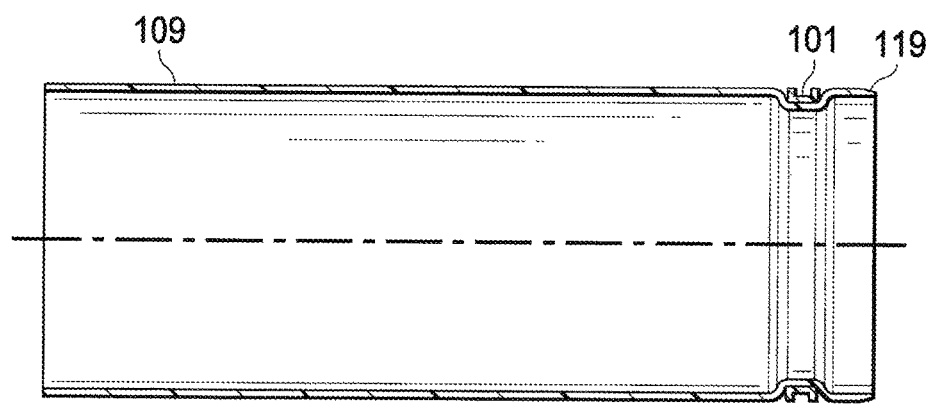

FIGS. 10 and 11 show the finishing steps in the process in which the transition ends (generally at 111, 113 in FIG. 9) are cut off, leaving the finished ends 115, 117. In the final step, shown in FIG. 11, the spigot pipe end 119 is beveled, followed by the implementation of any other desired finishing details.

The general details of molecularly oriented pipe manufacture are known in the relevant arts and are described, for example, in U.S. Pat. No. 4,428,900, issued Jan. 31, 1984, and similar references. These references describe the general process equipment and operating conditions employed.

An invention has been shown with several advantages. The pipe joint assembly technique does not rely upon machining a notch or upon the indentation of PVC-O which is hard and brittle by nature. Rather, an object is installed in a groove formed on the exterior of the pipe spigot wall, with the spigot wall following the shape of the object, instead of being thickened and notched. The spigot is formed around the desired object as it is expanded in a batch PVC-O process. Providing a casing on the exterior surface of the spigot preserves the spigot wall thickness, which is an advantage in working with PVC-O materials. Designs can be provided which are compatible with existing Rieber sealing gaskets used for the sealing function in a restrained and sealed pipe joint. A sealing and restraint system can be provided which works effectively, even with the so-call "30/60" Anger pipe sockets. Point loading and, notching of the spigot is avoided. The components of the scaling and restraint system are simple in design and economical to manufacture. Certain of the designs can be implemented without requiring a casing on the spigot, but use another type of restraining element instead.

While the invention has been shown in several of its forms, it is not thus limited but is susceptible to various changes and modifications without departing from the spirit thereof.

What is claimed is:

1. A method of manufacturing a spigot pipe end on a section of molecularly oriented pipe in which a restraining element is provided in a groove formed on an exterior surface of the section of pipe during the manufacturing process, rather than machining a notch in the material of the molecularly oriented pipe, the method comprising the steps of:
    providing an expansion mold having an exterior, an interior and a mold end cap;
    locating an annular restraining element within the mold interior;
    loading a section of molecularly oriented pipe into the expansion mold, the section of pipe having previously been extruded at a predetermined reduced diameter and closing the mold end cap;
    applying heat to the pipe until the pipe begins to soften and then expanding the pipe against the mold interior and casing by applying internal pressure to the softened pipe;
    allowing the mold and pipe to cool, opening the mold by opening or removing the end cap, followed by pulling the expanded pipe from the mold with the restraining element being trapped in a groove formed on the expanded pipe exterior surface.

2. The method of claim 1, wherein the restraining element is a metal casing element.

3. The method of claim 2, wherein the casing element is located within the mold interior and held in position by one or more retaining pins.

4. The method of claim 1, wherein the cooled pipe is pulled from the mold having transition ends formed thereon and wherein the pipe is further processed by cutting off the transition ends.

5. The method of claim 4, wherein at least selected ones of the pipe ends are further processed by beveling.

* * * * *